(No Model.) 2 Sheets—Sheet 1.
E. E. ROBISON.
BICYCLE BRAKE.
No. 600,045. Patented Mar. 1, 1898.
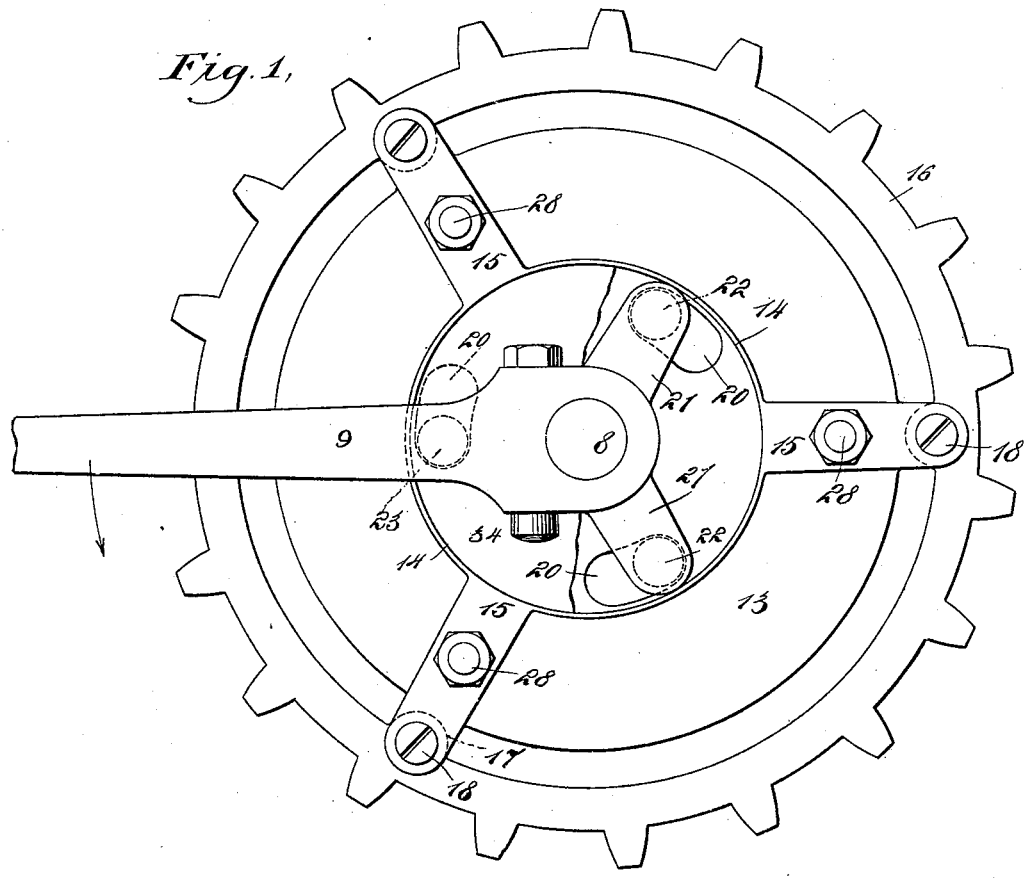
WITNESSES:
Edward Thorpe
Isaac B. Owens
INVENTOR
E. E. Robison
BY
ATTORNEYS.
THE NORRIS PETERS CO., PHOTO-LITHO., WASHINGTON, D. C.

(No Model.) 2 Sheets—Sheet 2.
E. E. ROBISON.
BICYCLE BRAKE.
No. 600,045. Patented Mar. 1, 1898.
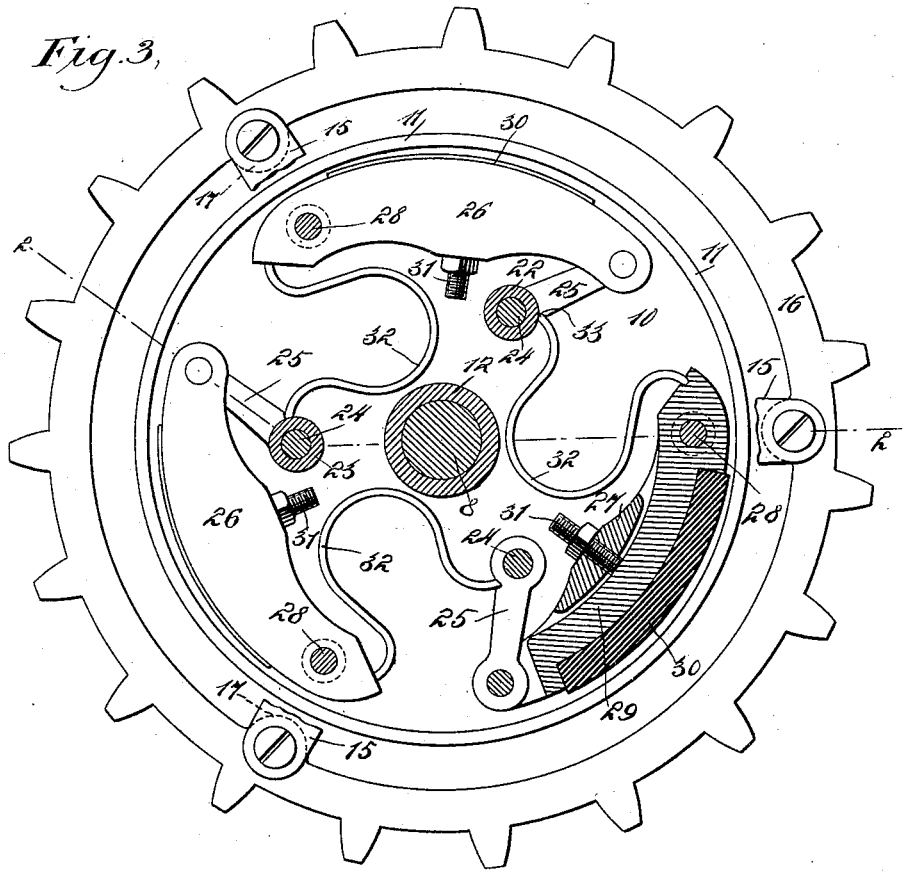
Fig. 3.
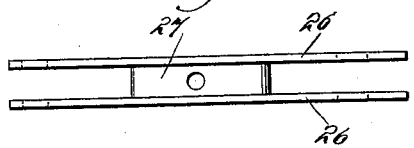
Fig. 4.
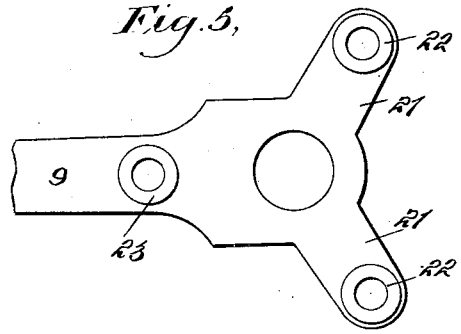
Fig. 5.
Fig. 6.
WITNESSES:
Edward Thorpe
Isaac B. Owens
INVENTOR
E. E. Robison
BY
ATTORNEYS.

UNITED STATES PATENT OFFICE.

ELMER E. ROBISON, OF AINGER, OHIO.

BICYCLE-BRAKE.

SPECIFICATION forming part of Letters Patent No. 600,045, dated March 1, 1898.

Application filed February 27, 1897. Serial No. 625,272. (No model.)

*To all whom it may concern:*

Be it known that I, ELMER E. ROBISON, of Ainger, in the county of Williams and State of Ohio, have invented a new and Improved Bicycle-Brake, of which the following is a full, clear, and exact description.

The object of this invention is to provide a brake which will be applied upon holding back the pedals of the driving-gear. This is accomplished by arranging brake-shoes to engage a fixed annular surface and connecting said brake-shoes with the pedal, so that movement may be applied to the brake-shoes from the pedal.

The invention will be fully described hereinafter and defined in the claims.

Reference is to be had to the accompanying drawings, forming a part of this specification, in which similar characters of reference indicate corresponding parts in all the figures.

Figure 1 is an end elevation of the invention with parts broken away. Fig. 2 is a section on the line 2 2 of Fig. 3. Fig. 3 is an end view, partly in section, on the line 3 3 in Fig. 2 and having parts broken away. Fig. 4 is a plan view of one part of the brake-shoes. Fig. 5 is an inverted fragmentary plan of the pedal-crank, and Fig. 6 is an edge view of a part of the brake-shoes.

The crank-hanger 7 carries the axle 8, on which the pedal-crank 9 is fixed. Fixed to the end of the crank-hanger 7, which end is adjacent to the pedal-crank 9, is a circular disk 10, having an annular flange 11 bent outward concentrically to the axle 8. Mounted loosely on the axle 8, through the medium of a hub 12, is a plate or disk 13, provided with a flange 14 on its outer face, the flange 14 being circular and concentric to the axle. The disk 13 is also provided with three radially-extending thickened portions 15, running outward from the flange 14 and projecting beyond the disk. A sprocket-rim 16, having inwardly-projecting ears 17, is carried by the thickened portions 15 of the disk 13 through the medium of the bolts 18, passing through the ears 17 and through those parts of the thickened portions 15, which parts project beyond the periphery of the disk 13. The disk 13 has an annular peripheral flange 19 extending inward and running around the outer side of the flange 11.

Formed in the disk 13, at points inward of the flange 14, are three arc-shaped slots 20 concentric to the axle 8. Fixed to the crank 9 and projecting radially from the axle 8 are two arms 21, carrying laterally and inwardly extending pins 22. Projecting from the inner face of the crank 9 and in a radial line from the axle 8 is a third transversely-extending pin 23, such pin being a distance from the axle 8 equal to the distance of the pins 22 from the axle 8. The pins 22 and pin 23, respectively, extend through the slots 20 of the plate or disk 13. Movement of the crank 9 in the direction of the arrow shown in Fig. 1 causes the pins 22 and pin 23 to engage against the left-hand end walls of the slots 20, which fixes the crank 9 to the disk 13 and causes such disk to turn freely with the axle 8 and thereby transmit movement to the sprocket-rim 16. The crank 9 has independent movement in a direction opposite to that of the arrow shown in Fig. 1, such movement being limited by the length of the slots 20.

Pivoted on the inner end of each pin 22 and 23 and through the medium of a screw 24 is a toggle-link 25. Each link 25 coacts with a brake-shoe. The brake-shoes each consist in a main frame having two side plates 26 joined at their inner middle portions by a block 27. Three pins 28 are secured, respectively, to the thickened portions 15 of the disk 13 and project inwardly therefrom toward the disk 10. The pins 28 respectively pass through the sides 26 of the frames of the brake-shoes, so as to mount the brake-shoes pivotally on the plate 13. The frames of the brake-shoes respectively carry blocks 29, having wearing-faces 30 let into their outer sides. The blocks 29 are located between the sides 26 of the frames of the brake-shoes and swing on the respective pins 28. Movable through the blocks 27 are set-screws 31, which serve to press the blocks 29 outward against the flange 11 of the disk 10. Engaging the short arm of each block 29 is one arm of a U-shaped spring 32. The remaining end of each spring 32 is engaged with a notch 33, formed near the pivoted end of the contiguous toggle-links 25. The arms of the springs 32 tend to expand, which tendency presses the blocks 29, and consequently the entire brake-shoes, inward toward the respective links 25, causing the brake-shoes to be normally disengaged from the flange 11. The pressure of the springs 32 on the links 25 pushes the inner ends of the links respectively in the direction of the middle of their several brake-shoes, such movement of the links 25 being limited by the engagement of the pins 22 and the pin 23 with the end walls of the slots 20. This action of the spring 32 also tends to hold the crank 9 in the position shown in Figs. 1 and 2, which is the normal position. When the bicycle is being driven forwardly, the axle and crank are turned in the direction of the arrow shown in Fig. 1. When the bicycle is to be braked, the pedals are held back, whereupon the pins 22 and the pin 23 move through the respective slots 20, thus swinging the inner ends of the links 25 in arcs concentric to the axle 8, thus causing the links to exert a toggle action on the brake-shoes, which pushes the wearing-faces 30 against the flange 11, and such flange being fixed on the crank-hanger 7 operates to retard the revolution of the sprocket-rim. As soon as the back pressure on the pedals is relaxed the springs 32 disengage the brake-shoes from the flange 11 and throw the inner ends of the links 25 back to their normal positions.

A circular plate or disk 34 is mounted loosely on the plate 13 and is inclosed by the flange 14. The plate or disk 34 has three openings respectively receiving the projections 22 and 23. The plate 34 serves to keep the dust from entering the slots 20. This plate is shown broken away in Fig. 1.

Having thus described my invention, I claim as new and desire to secure by Letters Patent—

1. The combination with a crank-hanger, of an axle mounted in the crank-hanger, a crank attached to the axle, a disk rigidly carried by the crank-hanger and having a flange, a second disk loose on the axle, a pin carried by the crank and projecting through the second disk, a link pivoted to the pin, a brake-shoe pivoted to the link and pivoted to the second disk, a spring pressing the brake-shoe, and a sprocket-rim carried by the second disk, substantially as described.

2. The combination of a shaft, a support wherein the shaft is revolubly mounted, said support being provided with a stationary friction-surface, a member loose on the shaft and having a slot therein and capable of having movement applied thereto, a crank fixed to the shaft and having a pin projected through the slot in the said member, a link pivoted on the pin, and a brake-shoe pivotally mounted on the said member and in connection with the link, the said brake-shoe being capable of engaging with the friction-surface of the support.

3. The combination of a support, a disk fixed to the support and having a laterally-run flange, a shaft revolubly mounted in the support, a crank fixed to the shaft and having a pin, a second disk loose on the shaft and having a slot through which the pin projects, a sprocket-rim carried by the loose or slotted disk, a brake-shoe pivoted to said loose or slotted disk, and a link attached to the pin of the crank and to the brake-shoe.

4. The combination of a support, a shaft revolubly mounted therein, a crank fixed to the shaft and having a plurality of pins rigidly secured thereon, a disk loose on the shaft and having slots through which the pins of the crank respectively extend, a plurality of brake-shoes pivotally mounted on the disk and capable of engaging with a portion of the support whereby the support forms a stationary friction-surface, a link pivoted to each brake-shoe, the links being respectively pivoted to the pins of the crank, and a plurality of bowed springs, the springs respectively engaging the brake-shoes and also respectively engaging the links.

5. The combination of a revoluble shaft, a member stationary with relation to said shaft, a member loose on the shaft, a crank fixed to the shaft, a brake-shoe pivotally mounted on said loose member and capable of engaging the said stationary member, and a link pivotally connected to the brake-shoe and to the crank.

ELMER E. ROBISON.

Witnesses:
E. A. BECHTOL,
E. C. BRANDON.